Nov. 3, 1953    A. A. GERHARD ET AL    2,657,705
REMOTELY CONTROLLABLE CRANKCASE DRAIN VALVE
Filed Oct. 19, 1950    3 Sheets-Sheet 1

Inventors
August A. Gerhard
Willard A. Klemme
By Milton Jones
Attorney

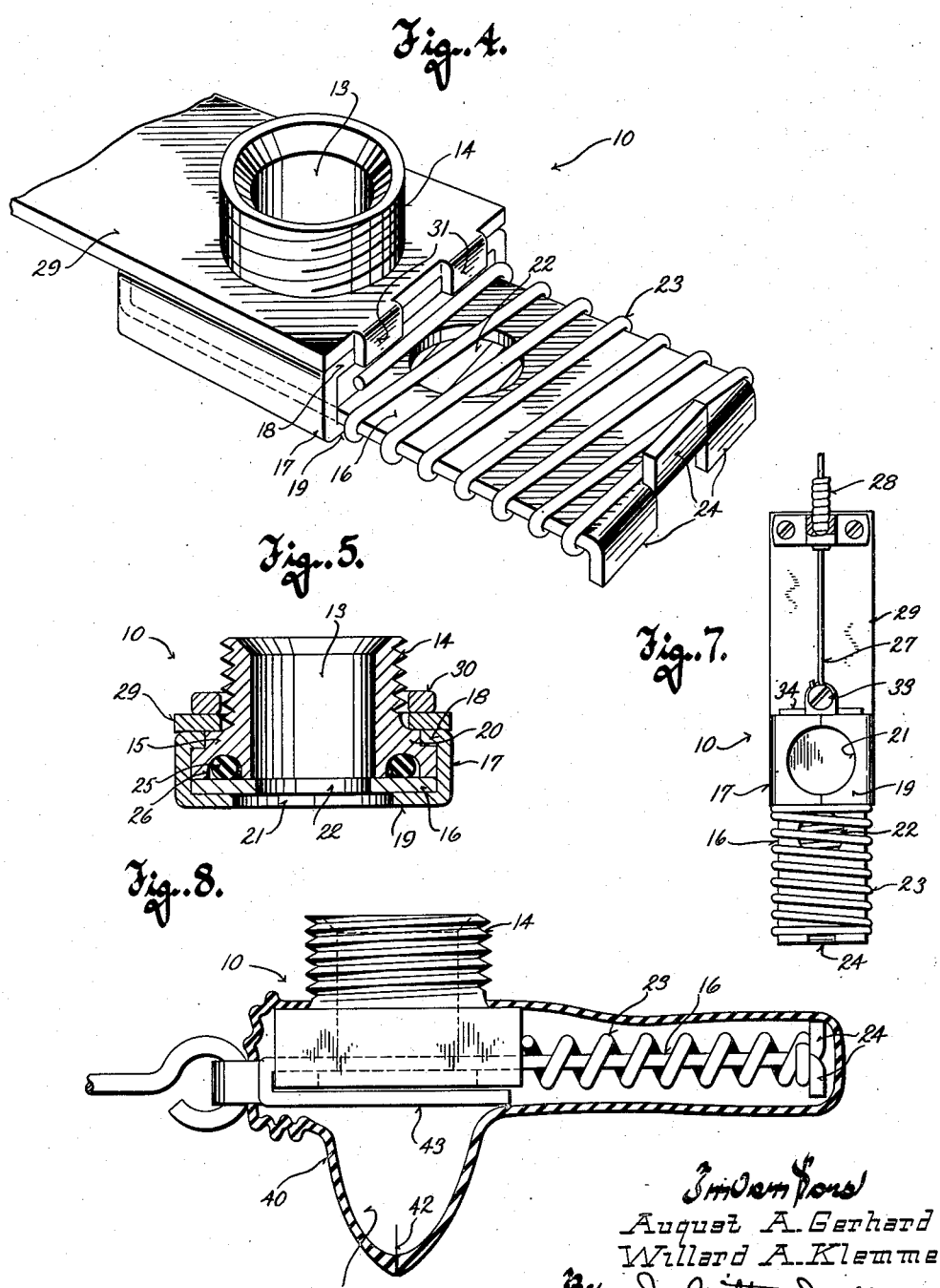

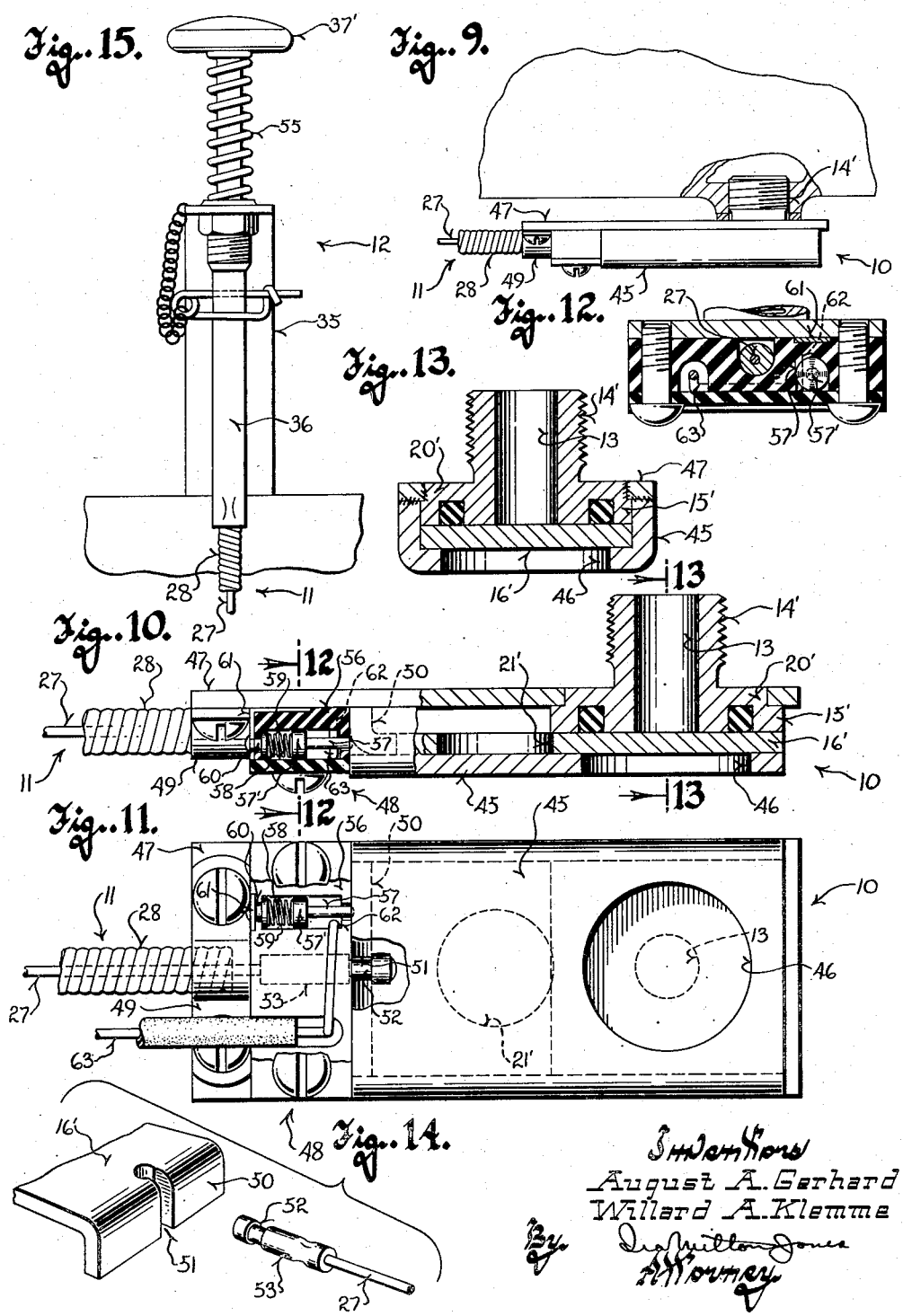

Patented Nov. 3, 1953

2,657,705

UNITED STATES PATENT OFFICE 2,657,705

REMOTELY CONTROLLABLE CRANKCASE DRAIN VALVE

August A. Gerhard, Wauwatosa, Wis., and Willard A. Klemme, Broadview, Ill.

Application October 19, 1950, Serial No. 191,054

5 Claims. (Cl. 137—351)

This invention relates to valves and has as its purpose to provide a practicable remotely controllable drain valve for motor vehicle crankcases.

The means usually provided for draining lubricating oil from the crankcase of an automobile engine comprises a threaded port in the bottom wall of the crankcase sump with a threaded cylindrical plug screwed into the port to close the same. Draining the oil is, of course, accomplished by removing the plug from the port, and while the actual unscrewing of the plug may not be too difficult, its inaccessible location makes draining the engine crankcase at best a difficult and messy task. The unpleasantness of the task is further increased by the fact that the dirty oil begins to seep out of the drain port as soon as the plug has been sufficiently loosened to provide a small opening, and gushes forth in a stream the instant the plug comes out of the port.

This objection to the conventional screw-type plug prompted several attempts in the past to provide a remotely controllable drain valve which enables the crankcase of a motor vehicle to be drained by actuation of a control situated in a convenient location on or near the top of the engine, but such prior valve devices have had an important disadvantage which has made their use impracticable on automobiles, and particularly on streamlined cars of recent design which have relatively low road clearance. This disadvantage resided in the fact that the valve portions of such devices were relatively bulky and projected below the crankcase sump a considerable distance. As a result they were extremely vulnerable to damage or destruction on unpaved or poorly paved roads.

By contrast, it is an object of this invention to provide a remotely controllable crankcase drain valve for motor vehicles which will be extremely flat and compact, projecting only a relatively small distance below the crankcase sump on which the valve is mounted, to thus insure substantial clearance between the road and the valve and thereby minimize the possibility of the valve being damaged or knocked off of the crankcase by an encounter with an obstruction in the road or by stones "kicked up" by the tires.

Another object of this invention resides in the provision of a simple and compact crankcase drain valve for motor vehicles which valve may be actuated by means of a control situated in a convenient location remote from the valve and which will be unusually inexpensive to manufacture by reason of the fact that it embodies relatively few parts, all of which may be manufactured at unusually low cost for tools, labor and materials.

Another disadvantage of the conventional drain plug lies in the fact that the operator of the vehicle has no personal assurance that the plug is securely fastened unless he crawls under the vehicle and tightens the plug himself. This is rarely done and the operator of the vehicle ordinarily leaves that responsibility to the serviceman. In some cases it has happened that the plug was not properly secured and the vibration of the vehicle in operation further loosened the plug to the extent that the oil escaped from the crankcase. Obviously, such leakage will cause serious damage to the engine if not discovered before the oil level drops to a dangerously low value. This disadvantage is overcome by the remotely controllable drain valve for the crankcase, but the personal attention of the operator of the vehicle is still necessary to assure that the drain valve is closed.

In this connection it is another object of this invention to provide a safety feature for the remotely controllable drain valve, which precludes the operation of the vehicle while the drain valve is open.

More specifically it is another object of this invention to provide an electrical cutout for the ignition system of an internal combustion engine, which is operable by the movement of the crankcase drain valve to open position, whereby the ignition system is disabled and the engine is rendered inoperative, while the drain valve is open.

Still another object of this invention is to provide a crankcase drain valve of the character described which has all exposed portions thereof encased within an elastic or resilient boot so designed and constructed that upon opening of the valve the oil discharges through an automatically reclosable port in the boot so that the boot at all times contains some oil to protect the operating parts of the valve and assure free actuation thereof.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate several complete examples of the physical embodiments of the invention constructed according to the best modes so far devised for the practical application of the principles thereof, and in which:

Figure 4 is a perspective view of the valve in closed position;

Figure 5 is a cross sectional view taken along the plane of the line 5—5 in Figure 3;

Figure 7 is a bottom view of the valve and its actuator wire mounting;

Figure 8 is a side elevational view of the valve, but equipped with a protecting boot which is shown in section;

Figure 9 is a fragmentary view of an automobile engine having a modified form of the crankcase drain valve of this invention installed thereon;

Figure 10 is an enlarged side elevational view of the drain valve shown in Figure 9 with parts thereof broken away and in section;

Figure 11 is a bottom view of the valve shown in Figure 10;

Figure 12 is a cross sectional view taken along the plane of the line 12—12 in Figure 10;

Figure 13 is a cross sectional view taken along the plane of the line 13—13 in Figure 10;

Figure 14 is a perspective view illustrating in detail the connection between the slide valve and the wire actuator; and Figure 15 is a view of the actuator means for the drain valve shown in Figures 9 to 14 inclusive.

Figure 1:
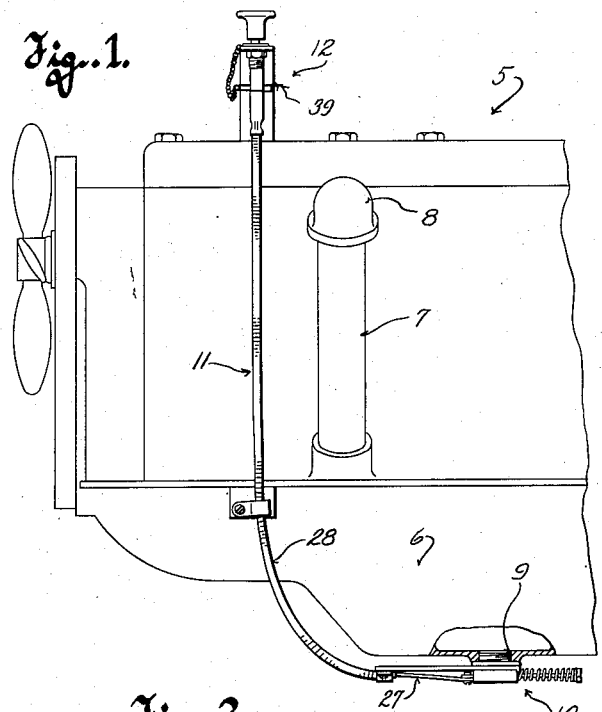
Figure 1 is a side view of an automobile engine having the crankcase drain valve of this invention installed thereon.
Figure 6:
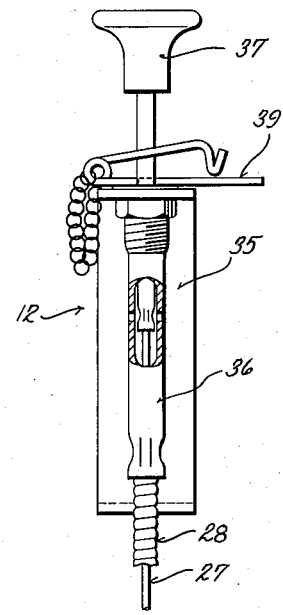
Figure 6 is an enlarged view of an actuator for the valve of this invention.
Figure 2:
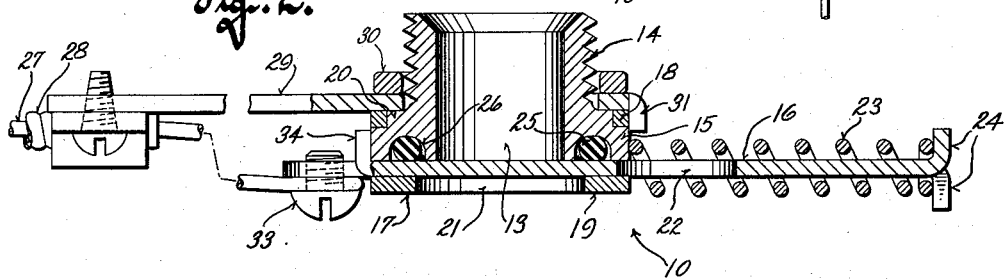
Figure 2 is a longitudinal sectional view through the valve of this invention showing the same in its closed position.
Figure 3:
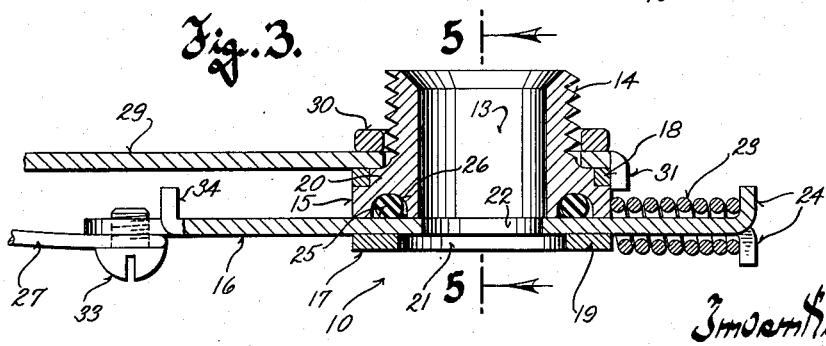
Figure 3 is a view similar to Figure 2 but showing the valve open.

Referring now more particularly to the accompanying drawings, the numeral 5 designates generally the engine of an automobile having a reservoir of lubricating oil in its crankcase 6. As is customary, the crankcase is filled through a conventional inlet duct 7 extending upwardly alongside the engine and closed by a removable filler cap 8.

To insure complete drainage of the crankcase its drain port 9 is located at the very lowest point therein. Consequently, access to the immediate vicinity of the drain port is ordinarily extremely difficult and while the valve 10 of this invention is installed in the drain port and thus is as difficult to reach as any conventional drain plug, its actuation may be effected from a far more accessible and convenient location. In other words, the valve is constructed so that it may be opened by a pull on a Bowden wire 11 which extends upwardly from the valve to a readily accessible control 12.

The body of the valve 10 consists of a plug having an axial bore 13 therethrough, an upper externally threaded stem portion 14 and a lower substantially block-like head portion 15 of less height than the stem portion. Consequently, when the stem portion is screwed into the drain port 9 and the valve is in position, as shown in Figure 1, it projects but a very short distance beneath the bottom of the crankcase.

The bottom of the head portion 15 is flat and perpendicular to the axis of the bore 13, and slidable across this flat bottom face of the plug is a slide valve or gate 16 held in position by a band-like retainer 17. The slide valve or gate 16 may be stamped from cold rolled flat strip steel and is of uniform width and thickness, at least for the length thereof which moves past the plug. The retainer 17 holds it snugly against the flat bottom of the plug and constrains it to endwise sliding movement.

The retainer 17 comprises a length of band stock and is virtually wrapped around the block-like lower portion 15 of the plug so that it has parallel upper and lower walls 18 and 19. The upper wall 18 has a hole of a size to fit the shouldered base 20 of the threaded stem portion and the lower wall 19 has a hole 21 in line with and preferably larger than the bore 13. The ends of the band forming the retainer abut one another at the bottom as shown in Figure 7 and if desired may be welded together.

The slide valve or gate 16 has a hole 22 therethrough adapted to be brought into alignment with the bore 13 and the hole 21 by endwise movement of the slide valve to its open position. A compression spring 23 reacting between the block-like lower portion 15 and tongues 24 bent from the slide valve at one end thereof yieldingly holds the valve in a position closing the mouth of the bore 13.

To preclude leakage when the valve is thus closed, an O-ring 25 of resilient petroleum resisting material, such as neoprene, is seated in an annular groove 26 in the flat bottom of the plug and encircling the mouth of its bore 13. The O-ring has a thickness, when free, slightly greater than the depth of the groove so that when the parts are assembled the ring is firmly clamped between the plug and the flat top of the slide valve.

The Bowden wire 11 by which the slide valve may be pulled against the bias of its spring 23 comprises the customary wire driving element 27 slidable in a sheath 28. The lower end of the sheath is anchored to an arm 29 clamped against the underside of the crankcase by the head portion 15 of the valve. For this purpose the arm 29 has a hole through which the threaded stem portion 14 projects, and preferably a gasket 30 is provided to be clamped between the top of the arm 29 and the bottom of the crankcase. Downturned tangs 31 on the mounted end of the arm 29 engage over the adjacent edge of the retainer 17 and thus hold the arm against rotation about the plug and in alignment with the longitudinal axis of the slide valve.

The lower end of the wire 27 which protrudes from the sheath is secured to the adjacent end of the slide valve by a screw 33; and a pair of upturned tangs 34 on this end of the slide valve engage with the adjacent face of the plug to limit the spring propelled movement of the slide valve and define its closed position.

Attention is directed to the fact that to assure maximum road clearance and reduce the height of the exposed portions of the valve unit the convolutions of the spring 23 are flattened to closely hug the top and bottom faces of the slide valve.

The control 12 may be of any suitable construction and in the present instance comprises a bracket 35 and a tubular sheath anchor 36 in which the upper end of the sheath 28 is secured. The bracket may be clamped to the cylinder head as shown or otherwise suitably fixed; and the upper end of the wire 27 has the stem of a knob 37 secured thereto inside the tubular sheath anchor 36. A removable pin 39 is preferably provided to secure the knob against accidental valve opening movement.

While it will be seen that the mechanism of the valve of this invention is relatively secure against incursions of dust and dirt which might interfere with its operation, to positively assure against fouling the valve, a protective boot 40 may be provided as shown in the modified embodiment of the invention illustrated in Figure 8. This boot is made of resilient petroleum resisting material, such as neoprene or the like, and completely surrounds the exposed portion of the valve thereby providing virtually absolute assurance against the entry of foreign matter.

An opening in the top of the boot provides for the application of the boot to the valve and the projection of the threaded stem therefrom. Generally the boot conforms quite closely to the shape of the valve except for a substantially conical sack-like portion 41 at its bottom directly beneath the plug. This sack has a slit 42 in its extreme bottom which is held closed by the natural elasticity or resiliency of the material but opens as the boot is filled by the oil discharging from the crankcase upon opening of the valve. When the flow stops, the slit recloses; and since the slit will close as soon as the tension of the boot material overcomes the weight of the oil in the boot, some of the oil will be retained in the boot to thereby keep the mechanism of the valve nicely lubricated at all times.

Though the depending sack 41 may afford all the protection needed for the underside of the valve, as a further precaution against injury of the valve by stones or the like thrown up by the tires the slide valve includes a guard 43 underlying the plug in the closed position of the valve.

The modification illustrated in Figures 9 to 15 inclusive, shows a remotely controllable drain valve for the engine crankcase of automotive vehicles, which is similar to the previously described valve, but embodies the additional safety feature of precluding operation of the engine while the valve is open.

In this modification, the valve 10 also has a plug with an axial bore 13 therethrough, an upper externally threaded stem portion 14', and a lower substantially block-like head portion 15'. Likewise the bottom of the head portion 15' is flat and perpendicular to the axis of the bore 13; and slidable across this flat bottom face of the head portion is a slide valve or gate 16' held in position by a U-shaped retainer 45 fixedly connected with the plug. Both the slide valve and the retainer extend a distance forwardly of the plug, that is, toward the lower end of the Bowden wire 11, and the valve is adapted to be actuated to open position by sliding thereof to the right or rearwardly as seen in Figure 10.

The short upstanding legs of the U-shaped retainer 45 are clamped over the opposite sides of the head portion 15' and the slide valve is received edgewise between them and flatwise between the bottom wall of the retainer and the head portion 15' of the plug. Hence, the bottom wall holds the slide valve 16' snugly against the flat bottom of the plug while the retainer legs constrain the valve to endwise sliding movement lengthwise of the legs of the retainer. The bottom wall of the U-shaped retainer has, of course, a hole 46 therethrough, in line with and preferably larger than the bore 13.

The slide valve or gate 16' also has a hole 21' therethrough adapted to be brought into alignment with the bore 13 and the hole 46 by rearward endwise movement of the slide valve to its open position.

The upper open side of the retainer 45 is closed by a base plate 47 having a hole of a size to fit the shouldered base 20' on the threaded stem portion of the plug to which it is permanently fixed, as by being welded thereto; and the ends of the upstanding legs of the U-shaped retainer are butt welded to the bottom surface of the base plate to hold the retainer in place on the plug. The base plate 47 extends forwardly over the slide valve and projects a distance beyond the forward end of the U-shaped retainer to provide a mounting base for a switch unit 48. The lower end of the sheath 28 of the Bowden wire 11 is also anchored to the forwardly projecting end of the plate 47 by means of a strap 49 secured to its underside ahead of the switch unit.

The front end 50 of the slide valve 16' is bent upwardly to slidably engage the bottom surface of the base plate 47 and hold the valve down onto the bottom wall of the retainer 45. The upwardly bent end 50 also engages the front of the head portion 15' on the plug to define the open position of the valve at which its hole 21' aligns with the bore 13. The upwardly bent end 50 also has a slot 51 therein to receive the reduced neck portion 52 of a connector 53 which is clamped to the actuator wire 27 of the Bowden wire 11, to drivingly connect the slide valve 16' with the Bowden wire.

It is to be noted that in this form of the invention the slide valve 16' is held in closed position by a compression spring 55 surrounding the stem of the knob 37' and confined between the knob and the top of the bracket 35 of the control 12. The force of the spring against the knob 37' is transmitted through the wire 27 to the slide valve 16' to thus yieldingly retain the slide valve in a closed position defined by the engagement of the upwardly bent end 50 of the valve with the insulating base 56 of the switch unit 48.

The safety feature of this modification resides in the use of an electrical cutout control which "shorts out" the ignition system of the engine and thus precludes operation of the engine whenever the drain valve is open. As brought out previously, the switch unit 48 is mounted on the underside of the plate 47, between the strap 49 and the forward end of the U-shaped retainer 45; and has an actuator 57 projecting rearwardly from the insulating base or switch housing 56 toward the end 50 of the slide valve for engagement thereby. The inner end of the actuator 57 has a head 57' thereon which provides the movable contact of the switch, and the head 57' is slidably confined in a chamber 58 formed in the switch housing, being urged rearwardly toward the rear end of the chamber by a spring 59 confined between the head 57' and the head of a rivet 60 on the opposite or forward end of the chamber. The rivet 60 fastens one end of a ground connector 61 to the front of the switch housing while the other end of the ground connector is clamped between the switch housing and the base plate 47 by the mounting screws for the switch housing. Thus it will be apparent, that the head 57' is electrically grounded through the spring 59, the rivet 60 and the ground connector 61.

The stationary contact for the switch comprises the end 62 of a wire 63, partially embedded in the switch housing but extending across the rear end of the chamber 58 to be engaged by the head 57' when the actuator is free to be propelled rearwardly by its spring 59. The other end of the wire 63 is connected to the primary side or electrical energy supply line of the distributor for the ignition system of the engine.

Thus, it will be seen that the engine will be operative only when the drain valve is closed and the head 57' is held out of contact with the contact 62 by the end 50 of the slide valve. When the slide valve is moved to open position, the spring 59 urges the head 57' into engagement with the contact 62 and thereby electrically connects the wire 63 with ground which "shorts out" the ignition system of the engine to preclude its operation.

In the event of breakage of either the actuator wire or the spring 55, the slide valve might accidentally move toward open position, but this will cause the head 57' to engage the contact 62 to "short out" the ignition system and thereby disable the engine until the necessary repairs have been made. Thus it will be apparent that the safety feature of the valve is independent of the control 12, and positively precludes operation of the engine if the drain valve is opened either intentionally or accidentally.

Inasmuch as the valve closing spring 55 is embodied in the control 12, it is remote from road and thus protected against dirt and stones which ordinarily strike the under carriage of a vehicle. Consequently failure of the spring due to clogging by dirt or breakage by stones is eliminated. In all other respects the control 12 is substantially similar to that of the previously described modification.

From the foregoing description taken together with the accompanying drawings, it will be readily apparent that this invention provides a practical and inexpensive remotely controllable crankcase drain valve which fully overcomes the objections to previous attempts to provide remotely controllable valves for this purpose.

What we claim as our invention is:

1. A remotely controllable crankcase drain valve, comprising: a plug having a head portion and a threaded stem portion, the latter being adapted to be screwed into a crankcase drain port, said plug having a bore axially therethrough and its head portion being axially shorter than its threaded stem portion; a flat slide valve having a hole therethrough; retaining means on the plug holding the flat slide valve in position for endwise sliding movement across the bottom face of the plug between an open position at which the hole in the slide valve registers with the mouth of the bore in the plug and a closed position at which the slide valve closes the mouth of the bore; a sealing ring encircling the mouth of the bore and clamped between the plug and the top face of the slide valve; a spring acting on the slide valve to yieldingly urge the same to its closed position; means for moving the slide valve against the force of the spring including a flexible Bowden wire having a flexible driving element slidable within a flexible sheath; means connecting one end of the driving element of the Bowden wire to the slide valve; a supporting arm having a hole through which the threaded stem portion of the plug passes so that when said stem is screwed into a crankcase drain port the supporting arm is clamped between the head portion of the plug and the crankcase; and means on the arm anchoring the adjacent end of the sheath of the Bowden wire thereto, whereby said valve may be controlled from a point remote therefrom.

2. A crankcase drain valve of the character described, comprising: a threaded plug adapted to be screwed into the drain port of a crankcase, said plug having a bore extending axially therethrough; a valve member movable to and from a position closing off flow through the bore; spring means yieldingly urging the valve member to its closed position; remotely actuatable means for moving the valve member to its open position against the bias of the spring means; and a boot encasing the entire drain valve with the exception of the threaded part of the plug which screws into the drain port, said boot having a bottom wall of elastic and resilient material provided with a slit-like discharge opening, said slit-like discharge opening being normally held closed by the natural elasticity and resiliency of the material and being adapted to open in response to the accumulation of a predetermined weight of oil in the boot.

3. A remotely controllable crankcase drain valve, comprising: a plug having a head portion and a threaded stem portion, the latter being adapted to be screwed into a crankcase drain port, said plug having a bore axially therethrough; a flat wall having a hole therethrough; side walls fixed with respect to said flat wall and extending up from opposite side edges thereof; means securing the side walls to the plug in a position holding said flat wall spaced a short distance below the bottom of the head portion of the plug with the hole in the flat wall in line with the mouth of the bore; a flat slide valve having a hole therethrough and slidably received in the space between said flat wall and the bottom of the head portion of the plug with the side edges of the slide valve contiguous to the side walls so that the slide valve is constrained to endwise movement between an open position at which its hole registers with the mouth of the bore and a closed position at which the slide valve closes the mouth of the bore, the bottom of the head portion of the plug having a groove encircling the mouth of the bore; a resilient sealing ring seated in the groove and confined between the bottom of the groove and the slide valve, said flat wall upon which the slide valve rides holding the valve firmly against the sealing ring; an arm extending from one side of the plug alongside the path of motion of the slide valve; a Bowden wire having a flexible driving element endwise slidable within a flexible sheath; means anchoring one end of the sheath of the Bowden wire to said arm; a readily detachable connection between the adjacent end of the driving element of the Bowden wire and the slide valve; an actuating stem on the opposite end of the driving element of the Bowden wire; bracket means fixed to the sheath of the Bowden wire at its end which is adjacent to said actuating stem for anchoring the sheath to an easily accessible part of an engine, said bracket means having a tubular part through which the actuating stem passes; said tubular part and the actuating stem having transverse holes positioned to align with one another when the slide valve is in its closed position so that the actuating stem and hence the slide valve may be locked in closed position by the insertion of a pin through said aligned transverse holes; and a spring acting on the connected slide valve and driving element of the Bowden wire biasing the valve to its closed position.

4. The remotely controllable crankcase drain valve defined in claim 3 further characterized by the fact that the connection between the driving element of the Bowden wire and the slide valve comprises a pair of endwise spaced abutments on the slide valve defined by a slot in the slide valve, and a pair of axially spaced abutments on the driving element, said abutments on the slide valve and the driving element of the Bowden wire being interengageable by relatively lateral motion of one of said elements with respect to the other; and further characterized by the fact that the securement of the adjacent end of the Bowden wire to the supporting arm holds the Bowden wire with the abutments of its driving element interengaged with the abutments of the slide valve.

5. The remotely controllable crankcase drain valve defined in claim 3 further characterized by the fact that said supporting arm comprises a flat plate secured to the plug with the underside thereof parallel to and spaced from the slide valve; by the fact that the slide valve has one end portion thereof turned up to provide a flange substantially perpendicular to said plate and the slide valve, said flange being slotted from its edge which is contiguous to the underside of the plate so that the opposite faces of the flange provide abutments spaced lengthwise of the slide valve; by the provision of a connector secured to the driving element of the Bowden wire, said connector having a head on its extremity connected to its body by a reduced neck of a size to fit in said slot so that the head and body of the connector are drivingly engageable with the abutments on the slide valve; and further by the fact that the securement of the adjacent end of the Bowden wire sheath to the supporting arm holds the connector engaged in the slot of the slide valve.

AUGUST A. GERHARD.
WILLARD A. KLEMME.

References Cited in the file of this patent

UNITED STATES PATENTS

| Number | Name | Date |
|---|---|---|
| 853,990 | McDowell | May 21, 1907 |
| 1,300,423 | Limpp | Apr. 15, 1919 |
| 1,345,672 | Henckler | July 6, 1920 |
| 1,566,946 | Witwer | Dec. 22, 1925 |
| 1,629,554 | Thompson | May 24, 1927 |
| 1,922,346 | Beal | Aug. 15, 1933 |
| 1,932,704 | McQuiston | Oct. 31, 1933 |
| 1,938,505 | Trice et al. | Dec. 5, 1933 |
| 1,995,174 | Gerrard et al. | Mar. 19, 1935 |
| 2,010,960 | Pogue | Aug. 13, 1935 |
| 2,021,587 | Agner | Nov. 19, 1935 |
| 2,095,696 | Hackel | Oct. 12, 1937 |
| 2,399,033 | Hudson | Apr. 23, 1946 |
| 2,472,677 | Phillips | June 7, 1949 |
| 2,501,869 | Loucks | Mar. 28, 1950 |
| 2,535,726 | Dalton | Dec. 26, 1950 |
| 2,594,318 | Langdon | Apr. 29, 1952 |